Figure 1:
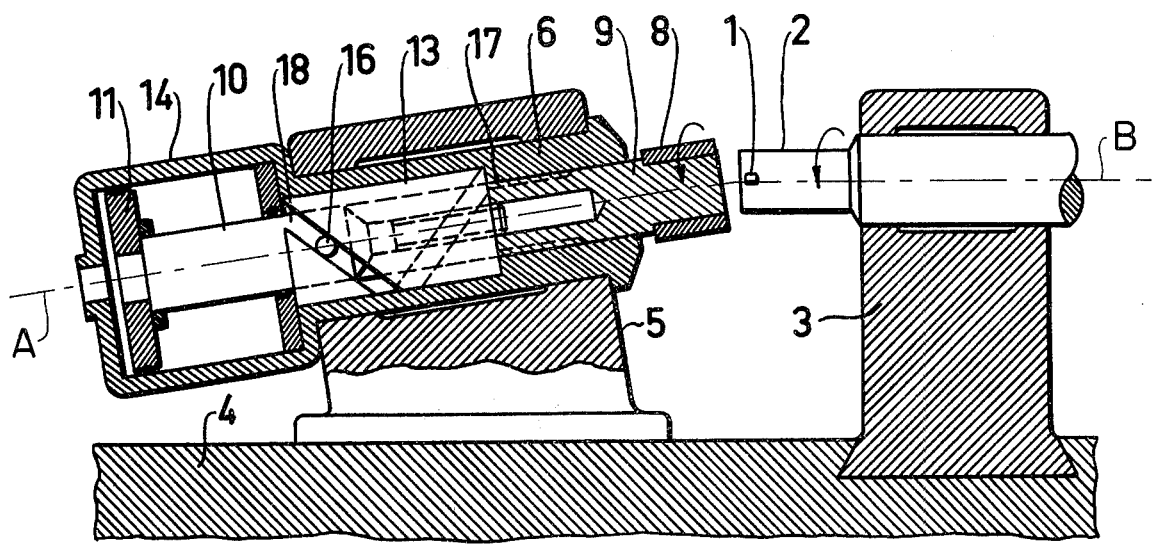

United States Patent [19]

Dahlin

[11] 4,034,646

[45] July 12, 1977

[54] THREAD MILLING APPARATUS

[75] Inventor: Gunnar Dahlin, Gavle, Sweden

[73] Assignee: Automatindustrier i Gavle AB, Gavle, Sweden

[21] Appl. No.: 590,167

[22] Filed: June 25, 1975

[30] Foreign Application Priority Data

June 26, 1974 Sweden .............................. 7408398

[51] Int. Cl.² ........................................... B23C 3/28
[52] U.S. Cl. ............................... 90/11.64; 90/11.4; 90/11.62
[58] Field of Search ............. 90/11.4, 11.42, 11.64, 90/11.6, 11.62, 11.66

[56] References Cited

U.S. PATENT DOCUMENTS

| 209,782 | 11/1878 | Swan | 90/11.62 X |
|---|---|---|---|
| 688,515 | 12/1901 | Hanson | 90/11.64 |
| 2,360,387 | 10/1944 | Baerwalde | 90/11.64 |
| 2,405,485 | 8/1946 | Barkstrom et al. | 90/11.64 |
| 2,871,765 | 2/1959 | Saari | 90/11.64 |
| 3,090,283 | 5/1963 | Chaffee, Jr. | 90/11.62 |
| 3,209,652 | 10/1965 | Burgsmueller | 90/11.4 |
| 3,728,823 | 4/1973 | Tomita | 90/11.62 X |

FOREIGN PATENT DOCUMENTS

| 492,858 | 7/1919 | France | 90/11.62 |
| 150,857 | 7/1955 | Sweden | 90/11.64 |

*Primary Examiner*—Francis S. Husar
*Assistant Examiner*—William R. Briggs
*Attorney, Agent, or Firm*—Pollock, VandeSande & Priddy

[57] ABSTRACT

An apparatus for cutting threads or grooves in a rotating workpiece with a rotating cutting tool, the tool and workpiece rotating in timed relationship, comprising an integer ratio between the revolutions of tool and workpiece and a superimposed rotation of tool or workpiece relative the other, which superimposed rotation is coupled to the feeding motion for tool or workpiece, the tool being arranged for rotation about an axis located outside the contour of the thread to be cut in the workpiece.

5 Claims, 2 Drawing Figures

THREAD MILLING APPARATUS

This invention relates to a thread milling machine having a rotary milling head and a rotating workpiece, arranged to provide threads in a workpiece having many inlets.

A plurality of methods and machines for thread milling are known, which, however, have the disadvantage that in making of threads with several inlets each thread slot is machined individually, usually by milling one slot at a time. This results in a long working time for each workpiece and requires complicated arrangements for turning the workpiece so that the distance between the slots will be exact.

Furthermore, milling machines for profiles, as e.g. hexagonal or square profiles etc., are known, which have two rotary parallel spindles, one of which receives the workpiece to be machined and the other being provided with the milling head. The rotation of these two spindles is interrelated so that an integer ratio between the speeds of the spindles is obtained. As a result, the workpiece will enter the same positions and be hit along the same generatrices on each occasion when hit by the knife. For instance, if the speed of the milling head is 6 times that of the workpiece and the head has two identical, diagonal knives the workpiece will be milled to a triangular cross section.

It is the object of this invention to provide thread milling by means of a polygon milling process. In this way all the thread slots can above all be milled in one operation. A speed deviating from said integer ratio is imparted to the workpiece, and in this way the points, where the cutter edge hits the workpiece, are gradually moved along the periphery of the workpiece. Moreover, this deviation of the speed is connected to the feeding of the workpiece or that of the milling spindle to obtain a helicoidal groove or thread slot in the workpiece.

According to the invention this is achieved in such a way that the ratio between the rotational speeds is an integer ratio and that a superimposed additional rotational motion controlled by the feeding motion is imparted to the workpiece or the milling tool.

By means of the invention the pitch of the thread or threads is determined entirely by the lead screw and is thus quite independent of the speeds of the spindles as well as the motion speed of the lead screw. For this reason it is simple to change the pitch of the thread by replacing the lead screw and the thread portion of the main spindle. The ratio between the speeds of the spindles and the number of knives of the milling spindle will then determine the number of thread inlets. The different diameters of the thread is completely determined by the appearance of the knives and the distance between the spindles, and in this way it is made possible to adjust the diameter measurements with great precision to desired values independently of the other adjusting parameters.

The ratio between the feed speed of the workpiece and the speed of the spindles will however decide the surface fineness of the threads, i.e. depending on how close in succession the knives of the milling spindle will machine the workpiece. Because the pitch of the thread is determined entirely by the lead screw, a great precision of the pitch can be maintained, and as all the threads can be machined by the same knife the threads can be obtained quite identical. Moreover, as the location of each thread slot along the axis of the workpiece is determined by the gear ratio between milling spindle and main spindle, a very great exactitude is obtained also here without complicated dividing means being required for the sake of symmetry. Moreover all the thread slots are machined, if there are several, in one working operation, which eliminates repetition of the milling process and consequently brings a great savings of time.

The milling spindle is mounted for rotation about an axis which is located outside of the contours of the thread to be milled in a workpiece carried by the main spindle, and the two spindles are preferably inclined relative to each other in such a way that the knives of the milling spindle run parallel with the thread slots in the working points in machining. In this way a very great surface fineness is obtained, in particular for the flanks of the threads. Furthermore, sharp thread profiles are made possible in this way, especially in case of threads with a great pitch.

The force or counter force necessary for the motion of the lead screw is supplied either in the form of a turning or pressing force. Preferably the force is turning at a small pitch and pressing at a great pitch of the lead screw. It is also possible that the force guiding the lead screw is adjusted so that it will supply a suitable feed speed together with the forces supplied to the lead screw in machining. In this way a simple control and supervision of the sharpness and exactitude of the knives in machining are made possible.

In a further developement of the invention it is also possible to mill conical threads by placing the spindles at another angle relative to each other.

Figure 2:
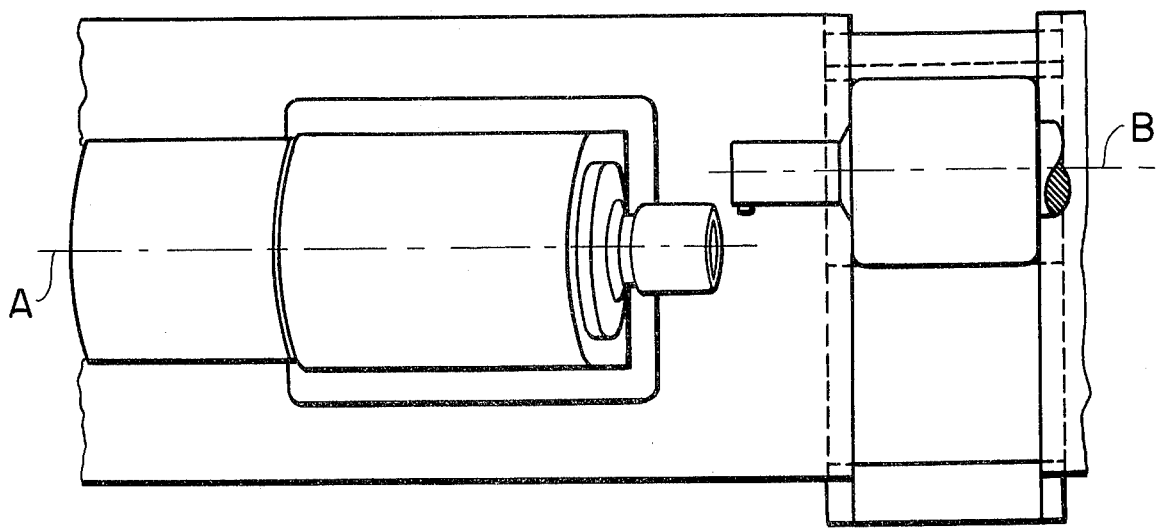

The invention will be described below in the form of an illustrative example of a thread milling machine with reference to the enclosed drawing, in which FIG. 1 shows a section of the central portions of the milling machine and FIG. 2 is a top view of the arrangement in FIG. 1.

The milling machine has two spindles, i.e. one main spindle 6 rotatable about an axis A and operative to support the workpiece 8, and a horizontal milling spindle 2 which is rotatable about an axis B and which is provided with a knife 1 on the front side of the spindle. The milling spindle 2 is mounted in a bracket 3, which is arranged displaceable orthogonally to the symmetry axes of the milling spindle in a horizontal supporting table 4. The main spindle 6 is rotatably mounted in a bracket 5 in front of the milling spindle 2 so that the horizontal projections of the spindle axes A, B are parallel (see FIG. 2). The bracket 5 is attached to the support table 4. The axis of rotation A of the main spindle 6 is inclined relative to the horizontal support table 4 and relative to axis B of spindle 2, and spindle 6 and is somewhat lower than the milling spindle 2. The main spindle 6 has its front end facing the milling spindle 2 and is provided there with a carrier 9 for the workpiece which retains the workpiece 8 in a fixed position. The carrier 9 is mounted concentrically in the main spindle 6 and is provided with a lead screw 17 at its rear portion.

For the sake of clearness those means are not shown which are required to impart rotation to the spindles.

In order that the lead screw 17 in the workpice carrier 9 might give the workpiece 8 the desired phase turning and feeding, a rotary motion is imparted to carrier 9 by a hydraulic, turning motor arranged in the main spindle 6. This consists of a hydraulic cylinder 14 adapted at the rear end of the spindle 6 and provided with connections, in which a piston 11 is movably arranged. This piston 11 is provided with a forwardly directed push rod 10, and the end of rod 10 remote from the piston 11 is interconnected to the workpiece carrier 9 by intervening splines so that rod 10 is nonrotatable relative to carrier 9 but is movable axially relative thereto. The push rod 10 is provided with a pin 16, which is mounted in a helical groove 18 in a cylinder 13 attached in the main spindle 6, which cylinder also serves for guiding the push rod 10. When the piston 11 is in its rearmost position the pin 16 is in the rear end of the groove 18, the portion of the push rod 10 provided with splines is maximally extracted from the workpiece carrier 9 and this is maximally screwed into the main spindle 6.

When using the device for threading the threading process starts from the starting position described above and shown in the Figures. The spindles rotate in the example shown in the same direction, which will permit opposed milling with the milling spindle 2 rotating at a speed, which is 4 times that of the main spindle 6. As the milling spindle 2 has only one knife 1, four thread inlets are thus obtained. By putting the piston 11 under a hydraulic pressure at the start of the theading process, which pressure acts on the rear side of the piston 11, feeding of the push rod 10 in a forward direction is obtained, the push rod simultaneously being forced to turn like a screw by the pin 16 in the groove 18 of the cylinder 13. This turning imparted to the push rod 10 is transferred via the splines to the workpiece carrier 9. When the carrier 9 is forced in this way to turn, the lead screw 17 will cause the workpiece carrier 9 and the workpiece adapted to this to be fed simultaneously towards the milling spindle 2, which feeding is superposed on the aforesaid motion of the milling spindle. The speed of this feeding and turning motion is selected so that suitable milling data are obtained. When the piston 11 has moved along the whole cylinder, the lead screw 17 has also accomplished its combined feeding and turning and the whole machining of the workpiece is finished.

In case the pitch of the lead screw is very great, it is of course possible to mount with advantage the push rod without splines directly in the workpiece carrier so that the force of its motion is transferred in the form of an axial force instead of a turning one.

Within the scope of the invention it is of course also possible, especially in milling long threads, to place the feeding and the superimposed rotation on the milling spindle. Unidirectional milling as well as opposed milling can also be used and milling of internal threads is also possible.

What is claimed is:

1. An apparatus for milling threads on a workpiece comprising a rotatably mounted workpiece holder, a cutting tool mounted adjacent said holder for rotation about an axis which is inclined in a vertical plane relative to the axis of rotation of said workpiece holder, horizontal projections of said two axes of rotation being longitudinally displaced from and substantially parallel to one another, the axis of rotation of said tool being located completely outside the contour of the thread that is to be milled on a workpiece carried by said holder, drive means rotating said workpiece holder and said cutting tool and controlling the respective rotational speeds of said holder and said tool in integer ratio to one another, and feeding means effecting relative translational motion of said rotating holder and rotating cutting tool in directions along their respective axes of rotation, said feeding means including means operative to superimpose a supplemental rotary motion proportional to the rate of said relative translational motion on one of said rotating workpiece holder and rotating tool, said rotatably mounted workpiece holder comprising an elongated cylindrical spindle mounted for rotation, an elongated cylindrical workpiece carrier supported by said spindle in coaxial relation thereto, said workpiece carrier having means for fixedly securing a workpiece thereto, said carrier including a lead screw in thread engagement with said spindle, said feeding means including means for turning said lead screw relative to said spindle to effect relative axial movement between said spindle and carrier.

2. The apparatus of claim 1 wherein said spindle includes a bore along its axis of rotation, said cylindrical workpiece carrier being disposed within said bore and having said lead screw on its exterior surface in thread engagement with facing interior threads on said bore.

3. The apparatus of claim 1 wherein said feeding means includes a rod coaxial with said spindle at a position rearward of said carrier, said rod being coupled to said workpiece carrier by splines operative to prevent relative rotation between said rod and said carrier while permitting relative axial motion between said rod and said carrier, and means for moving said rod along the axis of said spindle and carrier.

4. The apparatus of claim 1 wherein said last-named means comprises a hydraulic cylinder having a piston therein, said rod being connected to said piston.

5. The apparatus of claim 4 wherein said spindle includes means defining a helical groove, said rod having an outstanding pin disposed in said helical groove operative to effect rotational movement of said spindle relative to said carrier as said rod is moved axially to produce said supplemental rotary motion.

* * * * *